US012592848B2

(12) United States Patent
Niu et al.

(10) Patent No.: US 12,592,848 B2
(45) Date of Patent: Mar. 31, 2026

(54) DATA TRANSMISSION CHIP AND ELECTRONIC DEVICE

(71) Applicant: HUAWEI TECHNOLOGIES CO., LTD., Shenzhen (CN)

(72) Inventors: Yuanjun Niu, Xi'an (CN); Zhihuang Wei, Xi'an (CN); Junli Huang, Xi'an (CN); Haiqiang Ju, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/731,700

(22) Filed: Jun. 3, 2024

(65) Prior Publication Data

US 2024/0323061 A1 Sep. 26, 2024

Related U.S. Application Data

(63) Continuation of application No. PCT/CN2022/138258, filed on Dec. 11, 2022.

(30) Foreign Application Priority Data

Dec. 10, 2021 (CN) .......................... 202111509164.3
Dec. 31, 2021 (CN) .......................... 202111665986.0

(51) Int. Cl.
  *H04L 25/02* (2006.01)
(52) U.S. Cl.
  CPC ................................ *H04L 25/0272* (2013.01)

(58) Field of Classification Search
  CPC ............. H04L 25/0272; H04L 12/4633; G06F 2213/0002; G06F 2213/0016; G06F 13/385; G06F 13/4004; G06F 13/4045; G06F 13/4291; G06F 13/4282; G06F 15/17; Y02D 10/00
(Continued)

(56) References Cited

U.S. PATENT DOCUMENTS 4,001,883 A * 1/1977 Strout .................. G11B 27/326
                                                              360/48
6,970,956 B1 * 11/2005 Gaudet ..................... H04J 3/07
                                                              710/61
(Continued)

FOREIGN PATENT DOCUMENTS

CN        101706763 A      5/2010
CN        105071915 A      11/2015
(Continued)

OTHER PUBLICATIONS

International Search Report and Written Opinion in International Appln. No. PCT/CN2022/138258, mailed on Feb. 23, 2023, 14 pages (with English translation).
(Continued)

*Primary Examiner* — Emmanuel Bayard
(74) *Attorney, Agent, or Firm* — Fish & Richardson P.C.

(57)                   ABSTRACT
A data transmission chip and an electronic device are provided, and belong to the field of electronic technologies. A low-speed interface of the data transmission chip is configured to receive a plurality of channels of first signals, and a high-speed serial interface of the data transmission chip is configured to serially transmit the plurality of channels of first signals to another data transmission chip in a form of a data frame.

20 Claims, 9 Drawing Sheets

(58) Field of Classification Search
USPC ................................ 375/219–220, 260, 354
See application file for complete search history.

(56) References Cited

U.S. PATENT DOCUMENTS

| | | | | |
|---|---|---|---|---|
| 2005/0265303 | A1* | 12/2005 | Edwards | H04W 28/06 |
| | | | | 370/349 |
| 2011/0103404 | A1* | 5/2011 | Bafra | H04L 1/0084 |
| | | | | 370/476 |
| 2016/0371972 | A1* | 12/2016 | Moschopoulos | G08C 23/04 |
| 2017/0017587 | A1* | 1/2017 | West | G06F 13/4068 |
| 2017/0207905 | A1* | 7/2017 | Eitan | H04L 1/008 |
| 2019/0004987 | A1* | 1/2019 | Henson | G06F 13/4022 |
| 2020/0412357 | A1* | 12/2020 | Rizvi | H03K 19/018514 |
| 2022/0318174 | A1* | 10/2022 | Radke | G06F 13/4027 |

FOREIGN PATENT DOCUMENTS

| | | | |
|---|---|---|---|
| CN | 106301659 | A | 1/2017 |
| CN | 107171762 | A | 9/2017 |
| CN | 110049512 | A | 7/2019 |
| EP | 4398118 | A1 | 7/2024 |
| WO | 2012177330 | A1 | 12/2012 |

OTHER PUBLICATIONS

Extended European Search Report in European Appln. No. 22903627.2, mailed on Jan. 17, 2025, 9 pages.

MCS-51 Single Chip Microcomputer Course based on C language, 1st ed., Chen (ed)., May 2021, pp. 123-124, 5 pages (with English abstract).

\* cited by examiner

DATA TRANSMISSION CHIP AND ELECTRONIC DEVICE

CROSS-REFERENCE TO RELATED APPLICATIONS

This application is a continuation of International Application No. PCT/CN2022/138258, filed on Dec. 11, 2022, which claims priorities to Chinese Patent Application No. 202111509164.3, filed on Dec. 10, 2021, and Chinese Patent Application No. 202111665986.0, filed on Dec. 31, 2021. All of the aforementioned patent applications are hereby incorporated by reference in their entireties.

TECHNICAL FIELD

This application relates to the field of electronic technologies, and in particular, to a data transmission chip and an electronic device.

BACKGROUND

As performance of an electronic device improves, a quantity of chips in the electronic device also continuously increases. For example, the electronic device commonly includes a plurality of complex programmable logic devices (CPLDs), and different CPLDs commonly communicate with each other through a plurality of interfaces.

Because each interface in the CPLD needs to be connected to a corresponding interface in another CPLD through a plurality of signal lines, the CPLDs communicate with each other through the plurality of interfaces. Consequently, there are a large quantity of signal lines between the CPLDs, and a structure of the electronic device is complex.

SUMMARY

This application provides a data transmission chip and an electronic device, to resolve a technical problem that a structure of the electronic device is complex because there are a large quantity of signal lines between chips in the electronic device.

According to a first aspect, a data transmission chip is provided. The data transmission chip includes a high-speed serial interface and a low-speed interface. The low-speed interface is configured to receive a plurality of channels of first signals. The high-speed serial interface is configured to serially transmit the plurality of channels of first signals to another data transmission chip in a form of a data frame. A data transmission rate of the high-speed serial interface is higher than a data transmission rate of the low-speed interface.

Because the high-speed serial interface of the data transmission chip can serially transmit the plurality of channels of first signals to the another data transmission chip in the form of the data frame, a quantity of signal lines that need to be disposed between the data transmission chips can be effectively reduced, to further save pin resources of the data transmission chip, and simplify a structure of an electronic device. In addition, because the data transmission rate of the high-speed serial interface is high, transmission efficiency of the plurality of channels of first signals can be effectively ensured.

It may be understood that the data transmission chip may include one or more low-speed interfaces, and each low-speed interface may have a plurality of pins. The foregoing plurality of channels of first signals may be signals received through a plurality of different low-speed interfaces, or may be signals received through different pins of a same low-speed interface.

In a possible implementation, the high-speed serial interface is configured to generate the data frame based on data obtained by sampling the plurality of channels of first signals. Because the high-speed serial interface can carry data of the plurality of channels of first signals in one data frame, transmission efficiency and flexibility of a signal are effectively improved.

In another possible implementation, the high-speed serial interface is configured to sample the plurality of channels of first signals in parallel based on a frequency of a clock signal of the data transmission chip.

For example, the high-speed serial interface may sample the plurality of channels of first signals in parallel based on a first sampling frequency. The first sampling frequency may be less than or equal to the frequency of the clock signal of the data transmission chip, and may be K1 times a transmission frequency of the data frame, where K1 is an integer greater than 1. The first sampling frequency is set to a high value. Therefore, it can be ensured that distortion of the first signal is small, so that the another data transmission chip can accurately restore the first signal.

In another possible implementation, the data obtained by sampling through the high-speed serial interface may include a plurality of first sampling sequences sequentially arranged based on a sampling time order, and each first sampling sequence includes a multi-bit sampling value obtained by sampling the plurality of channels of first signals in parallel for one time.

Based on this, the high-speed serial interface may synchronously send the data frame in a process in which the data frame is generated based on the data obtained by sampling, and the high-speed serial interface does not need to wait for all fields of the data frame to be encapsulated before sending the data frame. Therefore, data sending efficiency is effectively improved.

In another possible implementation, the high-speed serial interface is further configured to: receive a plurality of channels of second signals that are serially sent by the another data transmission chip in a form of a data frame, and transmit the plurality of channels of second signals to the low-speed interface.

The high-speed serial interface of the data transmission chip provided in this application has both a data sending function and a data receiving function, in other words, the high-speed serial interface can implement bidirectional data transmission.

Optionally, the data transmission chip may include the plurality of low-speed interfaces. In a possible example, the data frame received through the high-speed serial interface further carries an identifier of each channel of second signals, and the high-speed serial interface may distinguish the channels of second signals based on the identifier, and transmit each channel of second signals to a corresponding low-speed interface. The identifier of the second signal may also be referred to as a tag.

In another possible example, the another data transmission chip may encapsulate the plurality of channels of second signals into the data frame based on a pre-agreed fixed order. After receiving the data frame, the high-speed serial interface may identify the plurality of channels of second signals based on the fixed order, and respectively send the plurality of channels of second signals to corresponding low-speed interfaces.

In another possible implementation, the high-speed serial interface is further configured to: sample, based on the frequency of the clock signal of the data transmission chip, the data frame sent by the another data transmission chip, and restore the plurality of channels of second signals based on data obtained by sampling.

For example, the high-speed serial interface may sample the plurality of channels of second signals in parallel based on a second sampling frequency. The second sampling frequency may be less than or equal to the frequency of the clock signal of the data transmission chip, or may be two times the frequency of the clock signal of the data transmission chip. In addition, the second sampling frequency may be K2 times a frequency of a clock signal of the another data transmission chip, where K2 is an integer greater than 1. Because the second sampling frequency is an integer multiple of the frequency of the clock signal of the another data transmission chip, it can be ensured that the high-speed serial interface can accurately obtain, by sampling, data carried in the data frame.

In another possible implementation, the data obtained by sampling the data frame sent by the another data transmission chip includes a plurality of second sampling sequences sequentially arranged based on a sampling time order, and each second sampling sequence includes a multi-bit sampling value. The high-speed serial interface is further configured to: sequentially obtain a one-bit sampling value from each second sampling sequence, and restore one channel of second signals based on the sequentially obtained multi-bit sampling value.

For example, for a $j^{th}$ channel of second signals in the plurality of channels of second signals, the high-speed serial interface is configured to: sequentially obtain a $j^{th}$ bit of the sampling value from each second sampling sequence based on an arrangement order of the plurality of second sampling sequences, and restore the $j^{th}$ channel of second signals based on the sequentially obtained multi-bit sampling value, where j is a positive integer, and j is not greater than a total quantity of channels of the plurality of channels of second signals.

In another possible implementation, the data transmission chip and the another data transmission chip may be located on a same printed circuit board (PCB); or the data transmission chip and the another data transmission chip may be located on different PCBs. In other words, in the solutions provided in this application, the high-speed serial interface of the data transmission chip may implement intra-board data communication, or may implement inter-board data communication.

In another possible implementation, the data frame may include a frame header, a plurality of data fields, and a gap field located behind each data field. The frame header includes an N-bit first value and an M-bit second value that are consecutive, the plurality of data fields are used to carry the data obtained by sampling the plurality of channels of first signals, a length of each data field is W bits, the gap field includes the M-bit second value, N is a positive integer greater than W, and M is a positive integer less than W.

Based on a frame structure of the foregoing data frame, it can be ensured that the another data transmission chip can accurately sample data in the data field to restore the plurality of channels of first signals, to further ensure signal transmission reliability.

A difference between N and W may be greater than or equal to 2, and a value of M may be 1. The difference between N and W is made greater than or equal to 2. Therefore, it can be ensured that the another data transmission chip can distinguish between the frame header and the data field of the data frame, to prevent sampling the data field incorrectly as the frame header. M is set to 1. This can increase a proportion of a payload (in other words, the length of the data field) in the data frame, to further effectively improve data transmission efficiency.

Optionally, the first value in the data frame may be 1, and the second value may be 0.

In another possible implementation, the data frame may further include a check field located behind the plurality of data fields, and a gap field located behind the check field. The check field is used to carry a check bit, and a length of the check field is equal to the length of the data field.

The check bit carried in the check field is obtained by calculating, through the high-speed serial interface by using a check algorithm, data carried in the plurality of data fields. After obtaining the data carried in the plurality of data fields and obtaining the check bit carried in the check field, the another data transmission chip may use the check bit to check the obtained data, to ensure accuracy of the received data.

According to a second aspect, a data transmission method is provided, and is applied to the data transmission chip provided in the first aspect. The method includes: receiving a plurality of channels of first signals through a low-speed interface; and serially transmitting the plurality of channels of first signals to another data transmission chip in a form of a data frame through a high-speed serial interface. A data transmission rate of the high-speed serial interface is higher than a data transmission rate of the low-speed interface.

In a possible implementation, the method may further include: sampling the plurality of channels of first signals, and generating the data frame based on data obtained by sampling.

In another possible implementation, a process of sampling the plurality of channels of first signals may include: sampling the plurality of channels of first signals in parallel based on a frequency of a clock signal of the data transmission chip.

In another possible implementation, the data obtained by sampling includes a plurality of first sampling sequences sequentially arranged based on a sampling time order, and each first sampling sequence includes a multi-bit sampling value obtained by sampling the plurality of channels of first signals in parallel for one time.

In another possible implementation, the method may further include: receiving, through the high-speed serial interface, a plurality of channels of second signals that are serially sent by the another data transmission chip in a form of a data frame, and transmitting the plurality of channels of second signals to the low-speed interface.

In another possible implementation, the method may further include: sampling, based on the frequency of the clock signal of the data transmission chip, the data frame sent by the another data transmission chip, and restoring the plurality of channels of second signals based on data obtained by sampling.

In another possible implementation, the data obtained by sampling the data frame sent by the another data transmission chip includes a plurality of second sampling sequences sequentially arranged based on a sampling time order, and each second sampling sequence includes a multi-bit sampling value. The restoring the plurality of channels of second signals based on data obtained by sampling includes: sequentially obtaining a one-bit sampling value from each second sampling sequence, and restoring one channel of second signals based on the sequentially obtained multi-bit sampling value.

According to a third aspect, a data transmission chip is provided. The data transmission chip includes a programmable logic circuit and/or program instructions, and the programmable logic circuit is configured to implement a function of the data transmission chip provided in the first aspect.

According to a fourth aspect, a data transmission chip is provided. The data transmission chip includes at least one module, and the at least one module may be configured to implement a function of the data transmission chip provided in the first aspect.

According to a fifth aspect, a computer-readable storage medium is provided. The computer-readable storage medium stores instructions, and the instructions are executed by a processing circuit to implement the data transmission method provided in the second aspect.

According to a sixth aspect, a computer program product including instructions is provided. When the computer program product runs on a processing circuit, the processing circuit is enabled to perform the data transmission method provided in the second aspect.

According to a seventh aspect, an electronic device is provided. The electronic device includes a data transmission chip, and the data transmission chip is configured to implement a function of the data transmission chip provided in the first aspect.

In a possible implementation, the electronic device may include a plurality of data transmission chips, and high-speed serial interfaces of two data transmission chips may be connected to each other via an electrical signal transmission medium.

In conclusion, this application provides a data transmission chip and an electronic device. In the solutions provided in this application, a low-speed interface of the data transmission chip is configured to receive a plurality of channels of first signals, and a high-speed serial interface of the data transmission chip is configured to serially transmit the plurality of channels of first signals to another data transmission chip in a form of a data frame. Because a plurality of channels of signals can be serially transmitted between the data transmission chips in a form of a data frame, a quantity of signal lines that need to be disposed between the data transmission chips can be effectively reduced, to further simplify a structure of the electronic device. In addition, because a data transmission rate of the high-speed serial interface is high, transmission efficiency of the plurality of channels of first signals can be effectively ensured.

In this application, based on the implementations provided in the foregoing aspects, the implementations may be further combined to provide more implementations.

DESCRIPTION OF EMBODIMENTS

To resolve the foregoing technical problem, embodiments of this application provide a data transmission chip. After receiving a plurality of channels of signals through a low-speed interface, the data transmission chip can serially transmit the plurality of channels of signals to another data transmission chip through a high-speed serial interface in a form of a data frame. In this way, a quantity of signal lines between the data transmission chips can be effectively reduced while a high data transmission rate is ensured.

The following describes in detail the data transmission chip and an electronic device provided in embodiments of this application with reference to the accompanying drawings.

Figure 1:
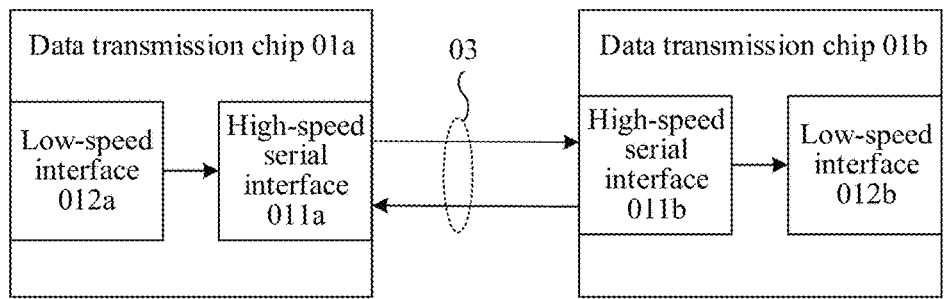
FIG. 1 is a schematic diagram of a structure of an electronic device according to an embodiment of this application.

FIG. 1 is a schematic diagram of a structure of an electronic device according to an embodiment of this application. The electronic device may be a computing device such as a server, an edge device, or a personal computer (PC), may be a mobile terminal such as a smartphone, or may be a switching device such as a switch or a router. As shown in FIG. 1, the electronic device includes two data transmission chips 01a and 01b, and each data transmission chip has a high-speed serial interface (Hisport) and a low-speed interface.

A high-speed serial interface 011a of the data transmission chip 01a may be connected to a high-speed serial interface 011b of the data transmission chip 01b via an electrical signal transmission medium 03, and a plurality of channels of signals of the low-speed interface can be serially transmitted via the electrical signal transmission medium 03 in a form of a data frame. In other words, the high-speed serial interface of the data transmission chip can carry the plurality of channels of signals of the low-speed interface in the form of the data frame.

FIG. 1 is used as an example. The high-speed serial interface 011a of the data transmission chip 01a is configured to: encapsulate, into a data frame, a plurality of channels of first signals received through a low-speed interface 012a, and serially transmit the data frame to the high-speed serial interface 011b of the data transmission chip 01b. The high-speed serial interface 011b is configured to decapsulate (also referred to as decoding) the received data frame, to restore the plurality of channels of first signals, and transmit the plurality of channels of first signals to a low-speed interface 012b.

It may be understood that the high-speed serial interface 011a and the high-speed serial interface 011b each may include a connection port (for example, a pin) configured to connect to the electrical signal transmission medium 03, and a logic circuit configured to process data. For example, the high-speed serial interface 011a may include a logic circuit configured to encapsulate the plurality of channels of first signals into the data frame, and the high-speed serial interface 011b may include a logic circuit configured to decapsulate the data frame.

In this embodiment of this application, a data transmission rate of the high-speed serial interface of each data transmission chip is higher than a data transmission rate of the low-speed interface. For example, the data transmission rate of the high-speed serial interface may be 10 or more times the data transmission rate of the low-speed interface. The data transmission rate may be a quantity of bits of data transmitted in a unit of time. The unit of time may be 1 second. Correspondingly, a unit of the data transmission rate may be bits per second (bps).

It may be understood that the low-speed interface described in this embodiment of this application is relative to the high-speed serial interface. The low-speed interface of each data transmission chip may include one or more of the following interfaces: a parallel input/output (I/O) interface, a serial peripheral interface (SPI), an inter-integrated circuit (IIC or I2C) interface, a universal asynchronous receiver/transmitter (UART) interface, a local bus (LBUS) interface, and the like.

In this embodiment of this application, each data transmission chip may include one or more low-speed interfaces, each low-speed interface may be connected to one low-speed component, and each low-speed interface has a plurality of pins. The plurality of channels of first signals received by the data transmission chip 01a may be signals that are received through different low-speed interfaces 012a and that are from different low-speed components, or may be different types of signals that are received through different pins of one low-speed interface 012a and that are from one low-speed component.

For example, assuming that the data transmission chip 01a includes a plurality of IIC interfaces, and each IIC interface is connected to one sensor (for example, a temperature sensor or a humidity sensor), the plurality of channels of first signals may be signals that are received through the plurality of IIC interfaces and that are from different sensors.

Optionally, the electronic device provided in this embodiment of this application may include more than two data transmission chips. Each data transmission chip may have a plurality of high-speed serial interfaces, and may be connected to a plurality of other data transmission chips through the plurality of high-speed serial interfaces. Each high-speed serial interface of any data transmission chip is connected to the one or more low-speed interfaces, and different high-speed serial interfaces may be respectively connected to different low-speed interfaces.

In this embodiment of this application, the data transmission chip may be an application-specific integrated circuit (ASIC), a programmable logic device (PLD), or a processor. The PLD may be a complex programmable logic device (CPLD), a field programmable gate array (FPGA), generic array logic (GAL), or the like. The processor may be a central processing unit (CPU), a network processor unit (NPU), a data processor unit (DPU), or the like.

In the solution provided in this embodiment of this application, a plurality of channels of signals can be serially transmitted between the data transmission chips through the high-speed serial interface in the form of the data frame. This can effectively reduce a quantity of signal lines that need to be disposed between the data transmission chips. This can further effectively reduce a quantity of pins occupied by the signal line between the chips, and save pin resources of the data transmission chip. In addition, because the transmission rate of the high-speed serial interface is high, transmission efficiency of the plurality of channels of signals can be effectively ensured.

It may be understood that each data transmission chip in the electronic device provided in this embodiment of this application may have both a data sending function and a data receiving function. The following describes the function of the data transmission chip in the electronic device by using an example in which the data transmission chip 01a in the electronic device is a chip on a data sending side and the data transmission chip 01b is a chip on a data receiving side.

Refer to FIG. 1. The low-speed interface 012a of the data transmission chip 01a is configured to receive the plurality of channels of first signals. The high-speed serial interface 011a is configured to serially send the plurality of channels of first signals to the data transmission chip 01b in a form of the data frame. In other words, the data transmission chip 01a can include data of the plurality of channels of first signals in the data frame, and serially send the data frame to the data transmission chip 01b.

Correspondingly, the high-speed serial interface 011b of the data transmission chip 01b is configured to: serially receive the plurality of channels of first signals that are sent by the data transmission chip 01a in the form of the data frame, and transmit the plurality of channels of first signals to the low-speed interface 012b.

It may be understood that the high-speed serial interface 011b can respectively transmit the plurality of channels of first signals obtained from the data frame to different low-speed interfaces 012b, or may transmit the plurality of channels of first signals to a plurality of different pins of one low-speed interface 012a.

Optionally, at least one low-speed interface 012b of the data transmission chip 01b may be in one-to-one correspondence with at least one low-speed interface 012a of the data transmission chip 01a, and each low-speed interface 012b and a corresponding low-speed interface 012a may be interfaces of a same type. Correspondingly, the data transmission chip 01b can transmit at least one channel of first signals of each low-speed interface 012a in the received data frame to a corresponding low-speed interface 012b.

Figure 2:
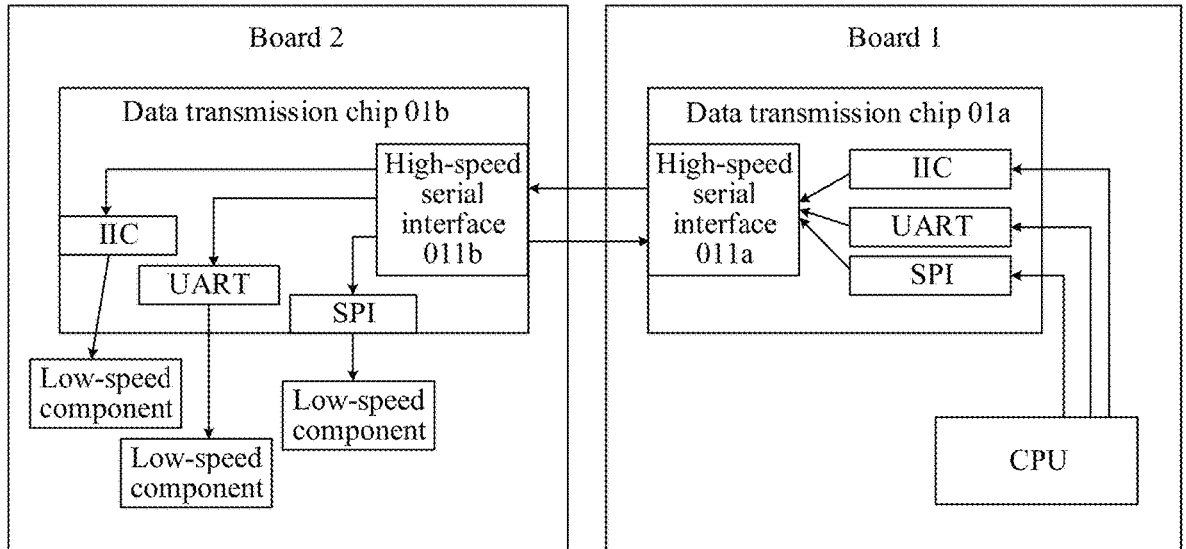
FIG. 2 is a schematic diagram of a structure of another electronic device according to an embodiment of this application.

For example, as shown in FIG. 2, assuming that the at least one low-speed interface 012a of the data transmission chip 01a includes an IIC interface, a UART interface, and an SPI, the at least one low-speed interface 012b of the data transmission chip 01b may also include an IIC interface, a UART interface, and an SPI. In addition, the data transmission chip 01*b* can transmit, to the IIC interface of the data transmission chip 01*b*, at least one channel of first signals that is in the data frame and that is from the IIC interface of the data transmission chip 01*a*, can transmit, to the UART interface of the data transmission chip 01*b*, at least one channel of first signals that is in the data frame and that is from the UART interface of the data transmission chip 01*a*, and can further transmit, to the SPI of the data transmission chip 01*b*, at least one channel of first signals that is in the data frame and that is from the SPI of the data transmission chip 01*a*.

In this embodiment of this application, the high-speed serial interface 011*a* of the data transmission chip 01*a* is configured to: sample, based on a frequency of a clock signal of the data transmission chip 01*a*, the plurality of channels of first signals received through the low-speed interface 012*a*, and generate the data frame based on data obtained by sampling. For example, the high-speed serial interface 011*a* may sample, based on a first sampling frequency f1, the plurality of channels of first signals received through the low-speed interface 012*a*. The first sampling frequency f1 may be equal to the frequency of the clock signal of the data transmission chip 01*a*, or may be 1/n of the frequency of the clock signal of the data transmission chip 01*a*, where n is an integer greater than 1.

After serially receiving the data frame sent by the data transmission chip 01*a*, the high-speed serial interface 011*b* of the data transmission chip 01*b* can sample the data frame based on a frequency of a clock signal of the data transmission chip 01*b*, to restore the plurality of channels of first signals. For example, the high-speed serial interface 011*b* may sample the received data frame based on a second sampling frequency f2. The second sampling frequency f2 may be equal to the frequency of the clock signal of the data transmission chip 01*b*, or may be two times the frequency of the clock signal of the data transmission chip 01*b*, or may be 1/m of the frequency of the clock signal of the data transmission chip 01*b*, where m is an integer greater than 1. In addition, it can be learned based on a sampling theorem that, when the high-speed serial interface 011*b* samples the data frame, the used second sampling frequency f2 needs to be greater than a data transmission rate of the data frame.

Figure 3:
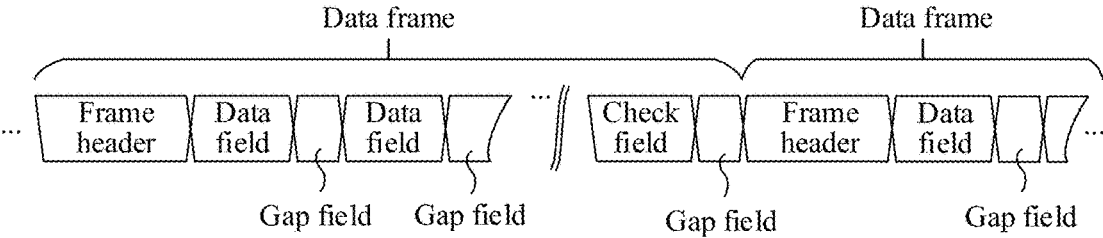
FIG. 3 is a schematic diagram of a data structure of a data frame according to an embodiment of this application.

FIG. 3 is a schematic diagram of a data structure of a data frame according to an embodiment of this application. As shown in FIG. 3, a data frame sent through the high-speed serial interface 011*a* of the data transmission chip 01*a* may include a frame header, a plurality of data fields, and a gap field located behind each data field. In addition, it can be further learned from FIG. 3 that the data transmission chip 01*a* may serially send a plurality of data frames through the high-speed serial interface 011*a*.

Figure 4:
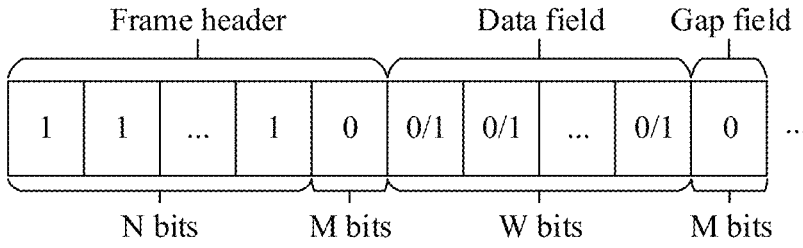
FIG. 4 is a schematic diagram of a partial structure of a data frame according to an embodiment of this application.

Refer to FIG. 4. The frame header may include an N-bit first value and an M-bit second value that are consecutive. The plurality of data fields are used to carry data obtained by sampling a plurality of channels of first signals, and a length of each data field is W bits. The gap field includes the M-bit second value. N is a positive integer greater than W, and M is a positive integer less than W.

In this embodiment of this application, both the first value and the second value may be binary numbers. The data that is carried in the plurality of data fields and that is obtained by sampling the plurality of channels of first signals is also a binary number. Because the frame header includes the N-bit first value and the M-bit second value, and N is an integer greater than W, it can be ensured that content of any data field is not repeated with that of the frame header.

Therefore, it can be further ensured that after the high-speed serial interface 011*b* of the data transmission chip 01*b* receives the data frame, the frame header and the data field of the data frame can be accurately distinguished.

For example, as shown in FIG. 4, the first value may be 1, and the second value may be 0. Correspondingly, the frame header may include N bits being 1 and M bits being 0 that are consecutive.

Optionally, to ensure accuracy of distinguishing between the frame header and the data field through the high-speed serial interface 011*b*, and prevent the high-speed serial interface 011*b* from incorrectly sampling the data field as the frame header, a difference between N and W may be greater than or equal to 2. In addition, to improve data transmission efficiency of the data frame, a length M of the gap field may be set to be less than a preset value. The preset value is less than W. The preset value may be set based on a service requirement, a data transmission delay, or another parameter that affects performance. For example, refer to FIG. 4. M may be set to 1. Correspondingly, if the length W of each data field is equal to 8, and the difference between N and W is 2, the frame header may include 10 bits being 1 and 1 bit being 0 that are consecutive, that is, a length of the frame header is 11 bits.

Based on a manner of setting the frame header, the data field, and the gap field of the data frame in this embodiment of this application, the high-speed serial interface 011*b* of the data transmission chip 01*b* can be enabled to accurately sample the data in the data field to restore the plurality of channels of first signals. This ensures signal transmission reliability. In comparison with a frame format of a data frame through another serial interface that uses a logic low level as a start bit for data transmission, a frame format of the data frame in this embodiment of this application may enable the data transmission chip 01*b* to sample the data in the data field without using a state machine. This further simplifies a circuit structure of the data transmission chip 01*b*, and reduces a requirement on a sampling frequency of the data transmission chip 01*b*. In addition, because the requirement on the sampling frequency of the data transmission chip 01*b* is low, the high-speed serial interface 011*a* of the data transmission chip 01*a* can send the data frame at a high data transmission rate. This effectively improves the data transmission rate. Furthermore, because each data frame can carry a plurality of data fields, an amount of data that can be transmitted in a single data frame is effectively increased. This further improves the data transmission efficiency.

Optionally, still refer to FIG. 3. The data frame may further include a check field located behind the plurality of data fields, and a gap field located behind the check field. The check field is used to carry a check bit, and a length of the check field is equal to the length of the data field.

In this embodiment of this application, the check bit carried in the check field is obtained by calculating, through the high-speed serial interface 011*a* of the data transmission chip 01*a* by using a check algorithm, the data carried in the plurality of data fields. After obtaining the data carried in the plurality of data fields and obtains the check bit carried in the check field, the high-speed serial interface 011*b* of the data transmission chip 01*b* may use the check bit to check the obtained data, to ensure accuracy of the received data.

The check algorithm used when the high-speed serial interface 011*a* calculates the check bit may include a cyclic redundancy check (CRC) algorithm, an exclusive OR algorithm, a cumulative sum algorithm, or the like.

Assuming that a quantity of data fields included in each data frame sent through the high-speed serial interface 011a is T, the first value is 1, and the second value is 0, key parameters of the data frame may be expressed as follows:

A frame header pattern frame_header_bitmap (that is, a frame header structure) is {N'b1, M'b0}. N'b1 indicates N bits being 1, and M'b0 indicates M bits being 0.

A frame length frame_length is that frame_length =

$$(W + M) \times (T + 2) + (N - W).$$

A payload payload_length satisfies that payload_length = $(W \times T)$.

Data transmission efficiency frame_efficiency (that is, a proportion of the payload in the data frame) is that frame_efficiency=payload_length/frame_length.

It may be understood that the data transmission rate at which the high-speed serial interface 011a sends the data frame, the quantity of data fields included in the data frame, and the length of each data field (which may also be referred to as a bit width of the data field) may be flexibly set based on a requirement in an application scenario. For example, requirements on data transmission bandwidth and a data transmission delay may be set based on data transmission requirements in different application scenarios. The data transmission requirement includes at least one of transmission factors such as a transmission rate, a transmission delay, and a quantity of data to be transmitted each time.

Optionally, to improve the data transmission efficiency, the high-speed serial interface 011a can sample the plurality of channels of first signals in parallel based on the frequency of the clock signal of the data transmission chip 01a, and generate the data frame based on data obtained by sampling in parallel. For example, the high-speed serial interface 011a can sample the plurality of channels of first signals in parallel based on the first sampling frequency f1. The first sampling frequency f1 may be K1 times a transmission frequency of the data frame, where K1 is an integer greater than 1.

The sampling frequency is a quantity of sampling times in a unit of time, and the unit of time may be 1 second. The transmission frequency of the data frame is a quantity of data frames transmitted through the high-speed serial interface 011a in the unit of time. It may be understood that the high-speed serial interface 011a may obtain a 1-bit sampling value by sampling one channel of first signals for one time, and the high-speed serial interface 011a may obtain an X-bit sampling value by sampling X channels of first signals in parallel for one time, where X is an integer greater than 1.

Because the first sampling frequency f1 is K1 times the transmission frequency of the data frame, in a transmission time period of one data frame, the high-speed serial interface 011a can sample the plurality of channels of first signals in parallel for K1 times. If a payload of the data frame is W×T, the data frame can carry a multi-bit sampling value obtained by sampling X=(W×T)/K1 channels of first signals in parallel for K1 times.

Figure 5:
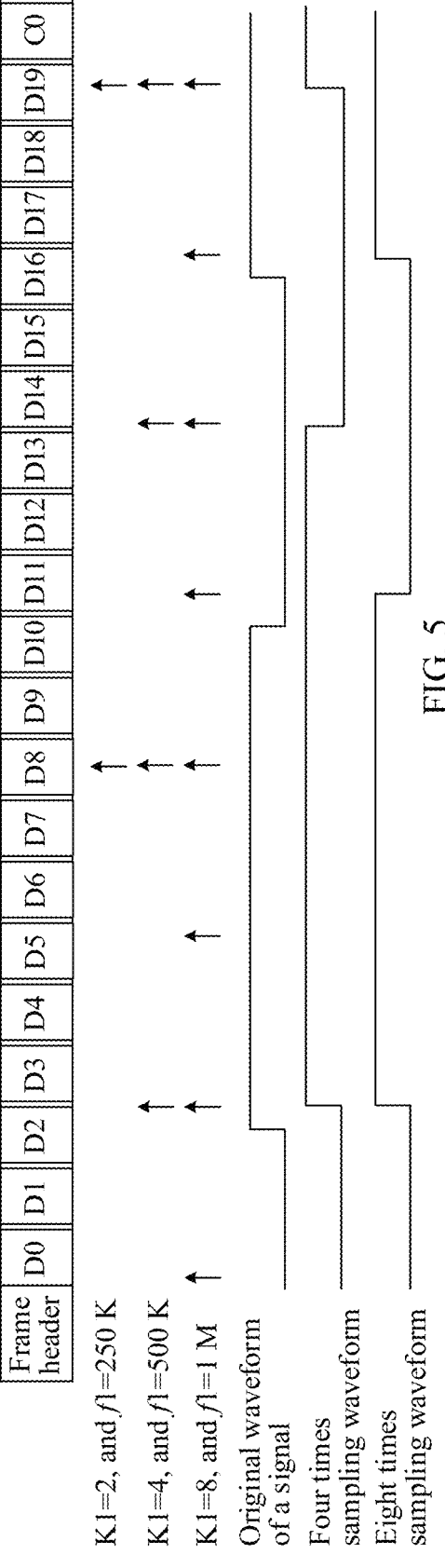
FIG. 5 is a schematic diagram in which a signal is sampled to generate a data frame according to an embodiment of this application.

For example, as shown in FIG. 5, it is assumed that the data frame includes 20 data fields in total from D0 to D19, a length of each data field and a length of a check field C0 are both 8 bits, a length of a gap field is 1 bit, and a length of a frame header is 11 bits. In this case, a frame length frame_length of the data frame is 200 bits, and a payload is 160 bits. If the data transmission rate of the high-speed serial interface 011a is 25 megabits per second (Mbps), it may be determined that a transmission frequency f0 of the data frame is that f0=25 Mbps/200 bit=125 kilohertz (KHz).

Refer to FIG. 5. If K1=2, the first sampling frequency f1 may be 250 KHz, and each data frame can carry a multi-bit sampling value obtained by sampling X=80 channels of first signals in parallel for two times. In other words, in each data frame, for each channel of first signals in the 80 channels of first signals, the high-speed serial interface 011a may sample the channel of first signals for two times, to obtain a 2-bit sampling value.

If K1=4, the first sampling frequency f1 may be 500 KHz, and each data frame can carry a multi-bit sampling value obtained by sampling X=40 channels of first signals in parallel for four times. In other words, in each data frame, for each channel of first signals in the 40 channels of first signals, the high-speed serial interface 011a may sample the channel of first signals for four times, to obtain a 4-bit sampling value.

If K1=8, the first sampling frequency f1 may be 1 MHZ, and each data frame can carry a multi-bit sampling value obtained by sampling X=20 channels of first signals in parallel for eight times. In other words, in each data frame, for each channel of first signals in the 20 channels of first signals, the high-speed serial interface 011a may sample the channel of first signals for eight times, to obtain an 8-bit sampling value.

FIG. 5 further shows an original waveform of one channel of first signals, and sampling waveforms obtained by sampling the channel of first signals for four times (that is, K1=4) and eight times (that is, K1=8) respectively. It can be learned from the waveforms shown in FIG. 5 that a higher first sampling frequency f1 indicates that a waveform of a signal obtained by sampling is closer to an original waveform of the signal.

According to the method provided in embodiments of this application, the plurality of channels of first signals are sampled in parallel by using the first sampling frequency f1, so that the data of the plurality of channels of first signals can be simultaneously transmitted in one data frame. This effectively improves transmission efficiency of the signal and transmission flexibility. In addition, because the first sampling frequency f1 is K1 times the transmission frequency of the data frame, each channel of first signals can be sampled at a high sampling frequency. Therefore, small signal distortion can be ensured, so that the high-speed serial interface 011b of the data transmission chip 01b can accurately restore the first signal.

Optionally, in the data frame sent through the high-speed serial interface 011a, the data carried in the plurality of data fields may include K1 first sampling sequences sequentially arranged based on a sampling time order, and each first sampling sequence includes a multi-bit sampling value obtained by sampling the plurality of channels of first signals in parallel for one time.

Based on this, in a process in which the low-speed interface 012a receives the plurality of channels of first signals, the high-speed serial interface 011a may synchronously sample the plurality of channels of first signals in parallel, and synchronously send the data frame. In other words, the high-speed serial interface 011a may synchronously send the data frame in a process in which the data frame is generated based on the data obtained by sampling, and the high-speed serial interface 011a does not need to wait for all fields of the data frame to be encapsulated before sending the data frame. Therefore, data sending efficiency is effectively improved.

For example, it is assumed that the data frame includes the 20 data fields in total from D0 to D19, and the length of each data field is 8 bits. If K1=4, the 20 data fields may carry four first sampling sequences, and each first sampling sequence may include a 40-bit sampling value obtained by sampling the 40 channels of first signals in parallel for one time. If K1=8, the 20 data fields may carry eight first sampling sequences, and each first sampling sequence may include a 20-bit sampling value obtained by sampling the 20 channels of first signals in parallel for one time.

It may be understood that, in each first sampling sequence, a plurality of sampling values obtained by sampling each channel of first signals may be arranged in a pre-agreed fixed order. For example, a $j^{th}$ bit of the sampling value in each first sampling sequence is a sampling value obtained by sampling a $j^{th}$ channel of first signals, where j is a positive integer not greater than X. In this way, after obtaining the plurality of sampling values from the data frame, the high-speed serial interface 011b of the data transmission chip 01b can accurately restore each channel of first signals based on the fixed order.

The following describes a process in which the high-speed serial interface 011b of the data transmission chip 01b restores the plurality of channels of first signals from the data frame after receiving the data frame.

In this embodiment of this application, after receiving the data frame, the high-speed serial interface 011b may sample the data frame based on the frequency of the clock signal of the data transmission chip 01b, and restore the plurality of channels of first signals based on data obtained by sampling. For example, the high-speed serial interface 011b can sample the received data frame based on the second sampling frequency f2, where the second sampling frequency f2 is K2 times a frequency of a clock signal CLK1 of the data transmission chip 01a, and K2 is an integer greater than 1. For example, K2 may be equal to 4. Because the second sampling frequency f2 is K2 times the frequency of the clock signal CLK1 of the data transmission chip 01a, it can be ensured that the data transmission chip 01b can accurately obtain, by sampling, the data carried in each data field of the data frame.

It may be understood that, when the high-speed serial interface 011a serially transmits the data frame based on the clock signal CLK1 of the data transmission chip 01a, the data transmission rate of the high-speed serial interface 011a may be two times the frequency of the clock signal CLK1, or may be less than or equal to the frequency of the clock signal CLK1.

Figure 6:
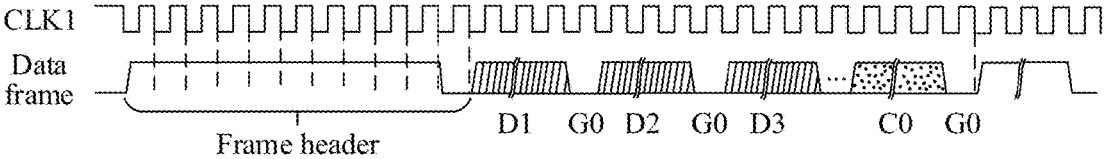
FIG. 6 is a schematic diagram in which a data transmission chip sends a data frame according to an embodiment of this application.

For example, as shown in FIG. 6, assuming that the high-speed serial interface 011a sends 1-bit data on each falling edge of the clock signal CLK1, the data transmission rate of the high-speed serial interface 011a may be equal to the frequency of the clock signal CLK1. Alternatively, if the high-speed serial interface 011a sends 1-bit data on each falling edge and each rising edge of the clock signal CLK1, the data transmission rate of the high-speed serial interface 011a may be equal to two times the frequency of the clock signal CLK1. Alternatively, if the high-speed serial interface 011a sends 1-bit data on every K0 falling edges (or every K0 rising edges) of the clock signal CLK1, the data transmission rate of the high-speed serial interface 011a may be equal to 1/K0 times the frequency of the clock signal CLK1, where K0 is an integer greater than 1.

Figure 7:
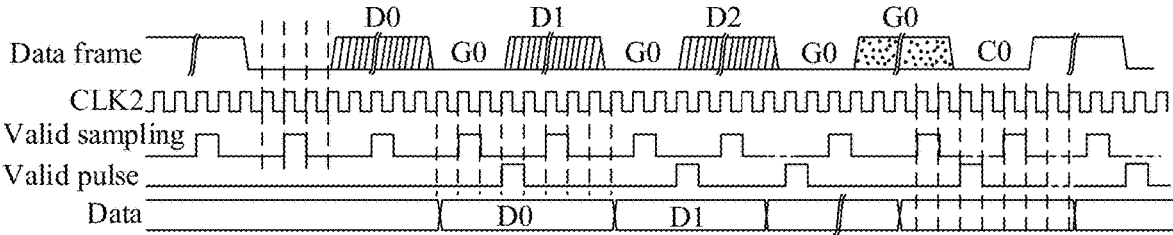
FIG. 7 is a schematic diagram in which a data transmission chip receives a data frame according to an embodiment of this application.

As shown in FIG. 7, assuming that the high-speed serial interface 011b of the data transmission chip 01b samples, after receiving the data frame, the data frame based on a frequency of a clock signal CLK2 of the data transmission chip 01b, in other words, the second sampling frequency f2 is equal to the frequency of the clock signal CLK2, the frequency of the clock signal CLK2 may be K2 times the frequency of the clock signal CLK1. For example, it can be learned by comparison between FIG. 6 and FIG. 7 that the frequency of the clock signal CLK2 is four times the frequency of the clock signal CLK1, that is, K2=4.

It may be understood that the high-speed serial interface 011b may sample the data frame for one time on each transition edge (for example, the rising edge or the falling edge) of the clock signal CLK2 of the data transmission chip 01b. In a scenario in which the frequency (that is, the second sampling frequency f2) of the clock signal CLK2 is K2 times the frequency of the clock signal CLK1, the high-speed serial interface 011b can obtain, from every K2 transition edges of the clock signal CLK2, a sampling value obtained by sampling on a kth transition edge in the K2 transition edges, and use the sampling value sampled on the kth transition edge as data used to restore the first signal, where k is a positive integer not greater than K2.

In addition, the high-speed serial interface 011b may further adjust a value of k based on a phase bias of a sampled frame header. For example, the high-speed serial interface 011b may adjust the value of k when detecting that the phase bias of the frame header exceeds a clock cycle of the clock signal CLK2, to ensure accuracy of the data obtained by sampling.

Optionally, the high-speed serial interface 011b may further determine, each time after a sampling value of a gap field G0 is obtained by sampling, that sampling on one data field is completed. Further, the high-speed serial interface 011b may restore the first signal based on data in the sampled data field.

For example, refer to FIG. 7. Assuming that K2=4 and k=2, the high-speed serial interface 011b may obtain, from every four transition edges of the clock signal CLK2, a sampling value obtained by sampling on a second transition edge in the four transition edges, and store the obtained sampling value in a register (for example, a shift register). In other words, a second sampling pulse in every four sampling pulses is a valid sampling pulse.

In addition, the high-speed serial interface 011b may generate a valid pulse after obtaining, by sampling, the sampling value of the gap field G0, and extract, based on the valid pulse, the sampling value stored in the register as data carried in a data field, to restore a signal.

It can be learned from the foregoing descriptions that the high-speed serial interface 011a can transmit the data frame based on a frequency of a local clock signal of the data transmission chip 01a, and the high-speed serial interface 011b can sample the received data frame based on a frequency of a local clock signal of the data transmission chip 01b. In other words, in the solution provided in this embodiment of this application, an asynchronous clock is used for data communication. Correspondingly, the high-speed serial interface may also be referred to as a high-speed asynchronous serial interface.

In comparison with data communication performed by using a synchronous clock, in this solution because the high-speed serial interface 011a does not need to separately transmit a clock signal to the high-speed serial interface 011b, a clock signal line for transmitting the clock signal does not need to be disposed between the data transmission chips. This can effectively reduce a quantity of signal lines that need to be disposed between the data transmission chips, and save pin resources of the data transmission chips.

It may be understood that, if the second sampling frequency f2 used when the high-speed serial interface 011*b* samples the data frame is K2 times the frequency of the clock signal CLK1 of the data transmission chip 01*a*, a frequency bias tolerance frequency_bias between the clock signal CLK1 of the data transmission chip 01*a* and the clock signal CLK2 of the data transmission chip 01*b* may satisfy that frequency_bias=1/(K2×frame_length). The frequency bias tolerance refers to a maximum frequency bias allowed by the frequencies of the local clock signals of the two data transmission chips.

In a scenario in which the high-speed serial interface 011*a* generates the data frame after sampling the plurality of channels of first signals in parallel, the data obtained by sampling the data frame through the high-speed serial interface 011*b* may include the K1 first sampling sequences sequentially arranged based on the sampling time order, and each first sampling sequence includes the multi-bit sampling value. Correspondingly, a process in which the high-speed serial interface 011*b* restores the plurality of channels of first signals based on the data obtained by sampling may include the following:

For the $j^{th}$ channel of first signals in the plurality of channels of first signals, the $j^{th}$ bit of the sampling value is sequentially obtained from each first sampling sequence based on an arrangement order of the K1 first sampling sequences, and the $j^{th}$ channel of first signals is restored based on a sequentially obtained K1-bit sampling value. If each first sampling sequence is obtained by sampling the X channels of first signals in parallel through the high-speed serial interface 011*a*, *j* is a positive integer not greater than X.

Optionally, in a scenario in which the data transmission chip 01*b* includes a plurality of low-speed interfaces 012*b*, the following possible examples are provided. In a possible example, the data field of the data frame received through the high-speed serial interface 011*b* may further carry an identifier of each channel of first signals. The high-speed serial interface 011*b* may further distinguish the channels of first signals based on the identifier, and transmit each channel of first signals to a corresponding low-speed interface 012*b*.

In another possible example, the high-speed serial interface 011*a* may encapsulate the plurality of channels of first signals into the data frame based on a pre-agreed fixed order. After obtaining the data in the data frame by sampling, the high-speed serial interface 011*b* may restore and identify the plurality of channels of first signals based on the fixed order, to further respectively send the plurality of channels of first signals to corresponding low-speed interfaces 012*b*.

Figure 8:
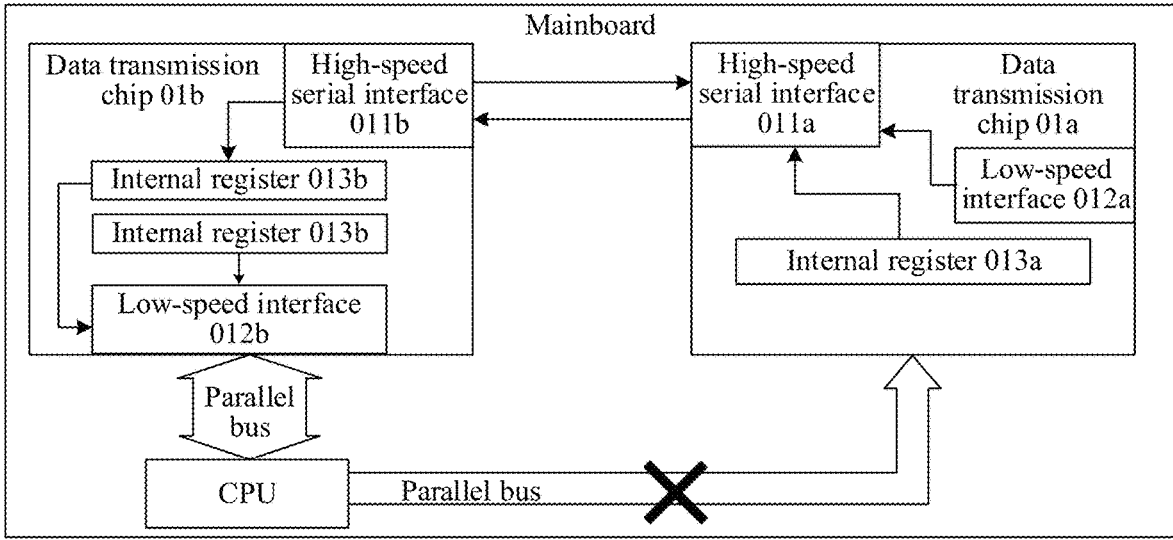
FIG. 8 is a schematic diagram of a structure of still another electronic device according to an embodiment of this application.

In an optional implementation, as shown in FIG. 8, the two data transmission chips 01*a* and 01*b* may be located on a same PCB in an electronic device. For example, the PCB may be a mainboard of the electronic device. Correspondingly, the electrical signal transmission medium 03 between the two data transmission chips 01*a* and 01*b* may be a metallic wire on the PCB. The PCB may also be referred to as a board. For example, in a scenario in which the electronic device is a server, the PCB may be a server board.

In this implementation, the electronic device may further include a main control component located on the mainboard. The main control component may be a central processing unit (CPU), a microcontroller unit (MCU), or the like. FIG. 8 is illustrated by using a CPU as an example. The main control component may be connected to the low-speed interface 012*b* of the data transmission chip 01*b* through a parallel bus. After the high-speed serial interface 011*a* of the data transmission chip 01*a* transmits a data frame to the data transmission chip 01*b*, the high-speed serial interface 011*b* of the data transmission chip 01*b* can sample data in the data frame, and then store the data in an internal register 013*b* of the data transmission chip 01*b*. Then, the low-speed interface 012*b* may transmit data in the internal register 013*b* to the main control component.

It can be learned from FIG. 8 that the data transmission chip 01*b* may include two groups of internal registers 013*b*, and each group of internal registers 013*b* may include one or more registers. One group of internal registers 013*b* may store data in the data transmission chip 01*b*, and the other group of internal registers 013*b* may be configured to store data sent by the data transmission chip 01*a*. Because the main control component may access the two groups of internal registers 013*b* through the parallel bus, both the data in the data transmission chip 01*b* and the data in the data transmission chip 01*a* can be obtained. Therefore, the main control component does not need to be connected to the data transmission chip 01*a* through the parallel bus. This effectively reduces a quantity of signal lines on the PCB.

Optionally, as shown in FIG. 8, the high-speed serial interface 011*a* of the data transmission chip 01*a* can be further connected to an internal register 013*a* of the data transmission chip 01*a*. Correspondingly, the high-speed serial interface 011*a* may serially transmit, to the data transmission chip 01*b*, a plurality of channels of first signals received through the low-speed interface 012*a*, and may serially transmit data in the internal register 013*a* to the data transmission chip 01*b*.

In another optional implementation, as shown in FIG. 2, the two data transmission chips 01*a* and 01*b* may be located on different PCBs in the electronic device. For example, as shown in FIG. 2, the data transmission chip 01*a* is located on a board 1 of the electronic device, and the data transmission chip 01*b* is located on a board 2 of the electronic device. The electrical signal transmission medium 03 between the two data transmission chips 01*a* and 01*b* may be an electrical signal transmission line, for example, may be a cable. Alternatively, the electrical signal transmission medium 03 may be a backplane (which may also be referred to as a backplane connector), and the PCBs on which the two data transmission chips 01*a* and 01*b* are located are inserted into the backplane, and may communicate with each other via the backplane.

In this implementation, the electronic device may further include at least one low-speed component and a main control component configured to control the at least one low-speed component. The main control component may be a CPU, an MCU, or the like. As shown in FIG. 2, the main control component (for example, the CPU) may be located on a same PCB as the data transmission chip 01*a*, and is connected to at least one low-speed interface of the data transmission chip 01*a*. The at least one low-speed component may be located on a same PCB as the data transmission chip 01*b*, and is connected to at least one low-speed interface of the data transmission chip 01*b*.

A low-speed component connected to an IIC interface may include a sensor (for example, a temperature sensor or a humidity sensor), an electrically erasable programmable read-only memory (EEPROM), and the like. A low-speed component connected to a UART interface may include an MCU and the like. A low-speed component connected to an SPI may include a flash memory (FLASH) and the like.

Based on the foregoing connection manner, the main control component may control a plurality of low-speed components on the different PCBs through the high-speed serial interface of the data transmission chip. This effectively reduces a quantity of signal lines between the different PCBs in the electronic device, and simplifies a structure of the electronic device.

Figure 9:
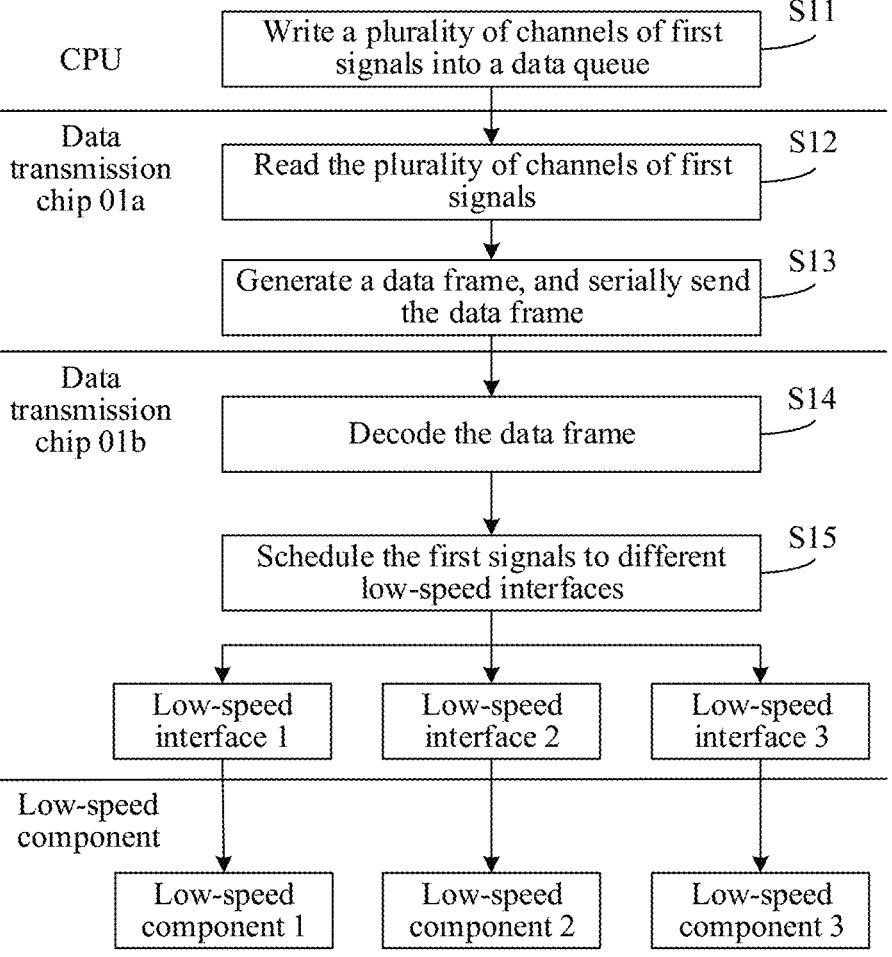
FIG. 9 is a schematic diagram in which a CPU sends a control command to a low-speed component via a data transmission chip according to an embodiment of this application.

FIG. 9 is a flowchart of a data transmission method according to an embodiment of this application. FIG. 9 is described by using an example in which a CPU transmits a plurality of channels of first signals to a plurality of low-speed components via data transmission chips 01*a* and 01*b*. As shown in FIG. 9, the method includes the following steps.

Step S11: The CPU writes the plurality of channels of first signals into a data queue.

The plurality of channels of first signals may be control commands used to control the plurality of low-speed components.

Step S12: A low-speed interface of the data transmission chip 01*a* reads the plurality of channels of first signals.

Step S13: A high-speed serial interface 011*a* of the data transmission chip 01*a* generates a data frame based on the plurality of channels of first signals, and serially sends the data frame to the data transmission chip 01*b*. In other words, the high-speed serial interface 011*a* may encapsulate the plurality of channels of first signals into a data field of the data frame.

Step S14: After receiving the data frame, a high-speed serial interface 011*b* of the data transmission chip 01*b* decodes the data frame to restore the plurality of channels of first signals.

Step S15: The high-speed serial interface 011*b* of the data transmission chip 01*b* schedules the plurality of channels of first signals to different low-speed interfaces, to enable the low-speed interfaces to transmit the plurality of channels of first signals to corresponding low-speed components. For example, the high-speed serial interface 011*b* may schedule the first signals to controllers of the different low-speed interfaces, and the controller of each low-speed interface may further transmit the first signal to a corresponding low-speed component through the low-speed interface.

An example in which the data transmission chip 01*a* is used as a chip on a data sending side and the data transmission chip 01*b* is used as a chip on a data receiving side is used for description above. It may be understood that the data transmission chip 01*b* may also be used as a chip on the data sending side to serially transmit the data frame to the data transmission chip 01*a*, in other words, the high-speed serial interface 011*a* of the data transmission chip 01*a* may also have a function of the high-speed serial interface 011*b* described above, and the high-speed serial interface 011*b* may also have a function of the high-speed serial interface 011*a* described above.

For example, the high-speed serial interface 011*a* is further configured to: receive a plurality of channels of second signals that are serially sent by the data transmission chip 01*b* in a form of a data frame, and transmit the plurality of channels of second signals to a low-speed interface 012*a*.

Optionally, the high-speed serial interface 011*a* can sample, based on a frequency of a clock signal of the data transmission chip 01*a*, the data frame sent by the data transmission chip 01*b*, and restore the plurality of channels of second signals based on data obtained by sampling.

The data obtained, through the high-speed serial interface 011*a*, by sampling the data frame sent by the data transmission chip 01*a* may include a plurality of second sampling sequences sequentially arranged based on a sampling time order, and each second sampling sequence includes a multi-bit sampling value. Correspondingly, the high-speed serial interface 011*a* is further configured to: sequentially obtain a one-bit sampling value from each second sampling sequence, and restore one channel of second signals based on the sequentially obtained multi-bit sampling value.

For a process in which the high-speed serial interface 011*a* samples the received data frame to restore the plurality of channels of second signals, refer to related descriptions of restoring the plurality of channels of first signals through the high-speed serial interface 011*b* in the foregoing embodiments. Details are not described herein again.

Figure 10:
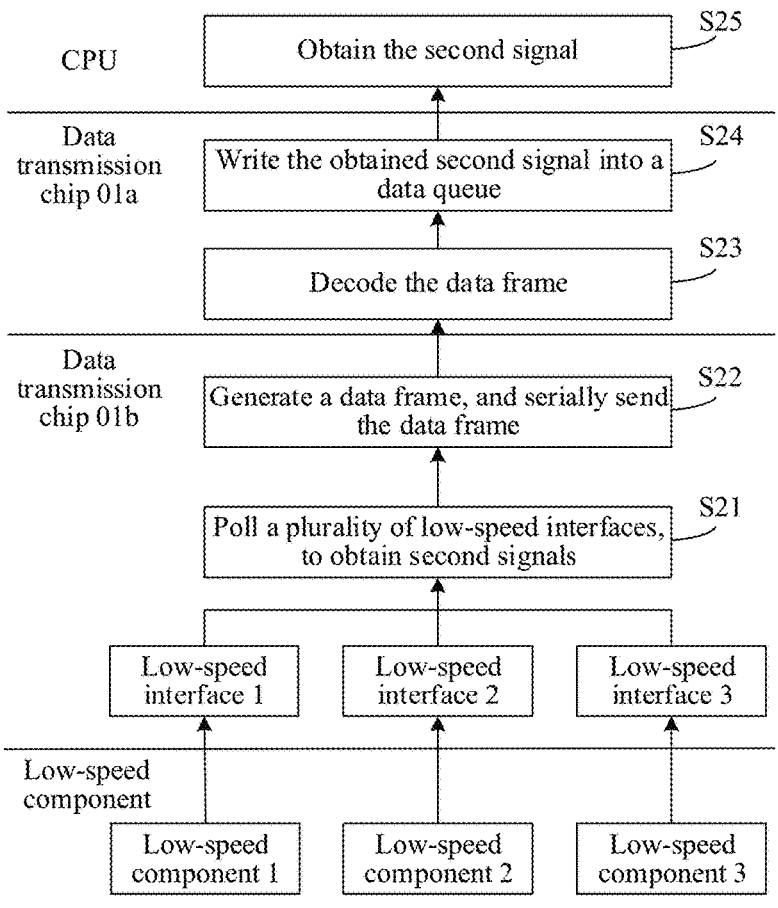
FIG. 10 is a schematic diagram in which a low-speed component sends an execution result to a CPU via a data transmission chip according to an embodiment of this application.

FIG. 10 is a flowchart of another data transmission method according to an embodiment of this application. FIG. 10 is described by using an example in which a plurality of low-speed components transmit a plurality of channels of second signals to a CPU via data transmission chips 01*a* and 01*b*. As shown in FIG. 10, the method may include the following steps.

Step S21: A high-speed serial interface 011*b* of the data transmission chip 01*b* polls each low-speed interface 012*b*, to obtain the plurality of channels of second signals.

In this embodiment of this application, each channel of second signals may be signals sent by a low-speed component to a low-speed interface 012*b* connected to the low-speed component. For example, assuming that the first signal in the embodiment shown in FIG. 9 is a control command, after receiving the control command, each low-speed component may perform a corresponding operation in response to the control command, and return an execution result of the operation to a corresponding low-speed interface 012*b* of the data transmission chip 01*b*. In other words, each channel of second signals may be an execution result fed back by the low-speed component.

Step S22: The high-speed serial interface 011*b* of the data transmission chip 01*b* generates a data frame based on the plurality of channels of second signals that are obtained, and serially sends the data frame to the data transmission chip 01*a*. In other words, the data transmission chip 01*b* may encapsulate the plurality of channels of second signals into a data field of the data frame, and send the data frame generated through encapsulation to the data transmission chip 01*a*.

Step S23: After receiving the data frame, a high-speed serial interface 011*a* of the data transmission chip 01*a* decodes the data frame to restore the plurality of channels of second signals.

Step S24: The high-speed serial interface 011*a* of the data transmission chip 01*a* writes the plurality of channels of second signals into a data queue.

Step S25: The CPU reads the data queue through a low-speed interface 012*a* of the data transmission chip 01*a*, to obtain the plurality of channels of second signals.

In a possible example, as shown in FIG. 2, a type of a low-speed interface that is in the data transmission chip 01*a* and that is configured to connect to a main control component may be the same as a type of a low-speed interface that is in the data transmission chip 01*b* and that is configured to connect to the low-speed component. For example, refer to FIG. 2. The low-speed interface that is in the data transmission chip 01*a* and that is configured to connect to the main control component includes an IIC interface, a UART interface, and an SPI interface. Correspondingly, the low-speed interface that is in the data transmission chip 01*b* and that is configured to connect to the low-speed component also includes an IIC interface, a UART interface, and an SPI interface.

Figure 11:
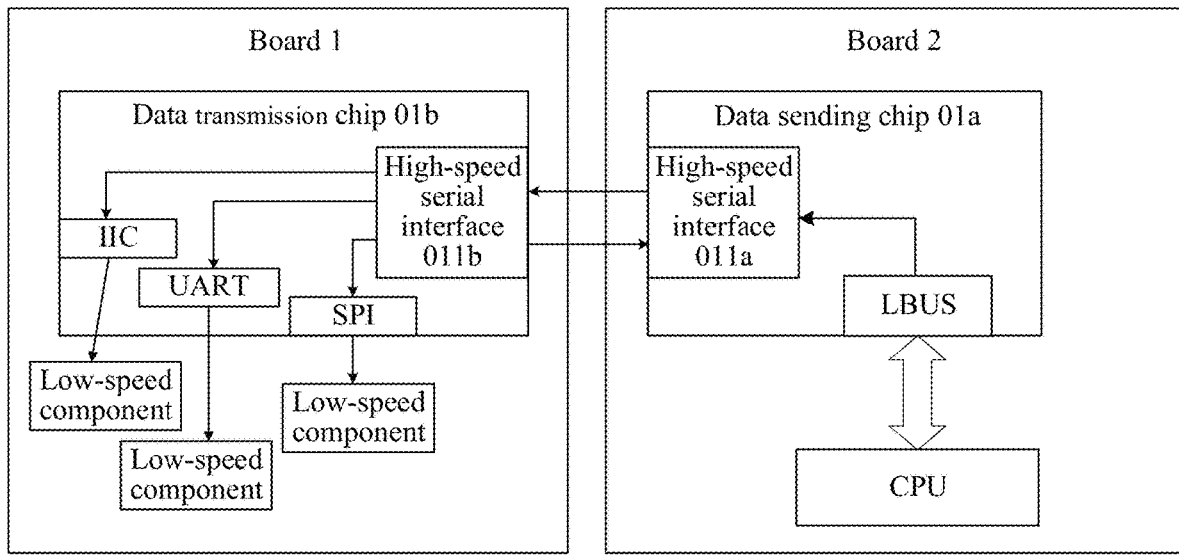
FIG. 11 is a schematic diagram of a structure of yet another electronic device according to an embodiment of this application.

In another possible example, as shown in FIG. 11, a type of a low-speed interface that is in the data transmission chip 01*a* and that is configured to connect to a main control component may be different from a type of a low-speed interface that is in the data transmission chip 01*b* and that is configured to connect to the low-speed component. For example, refer to FIG. 11. The low-speed interface that is in the data transmission chip 01*a* and that is connected to the main control component may be an LBUS interface. The low-speed interface that is in the data transmission chip 01*b* and that is connected to the low-speed component may include an IIC interface, a UART interface, and an SPI interface.

Optionally, in the example shown in FIG. 2, the data transmission chip 01*a* may further include an LBUS interface, and the IIC interface, the UART interface, and the SPI interface of the data transmission chip 01*a* may be connected to the CPU through the LBUS interface.

An example in which the main control component communicates, through the LBUS interface of the data transmission chip 01*a*, with a low-speed component connected to a plurality of IIC interfaces of the data transmission chip 01*b* is used for description below.

Figure 12:
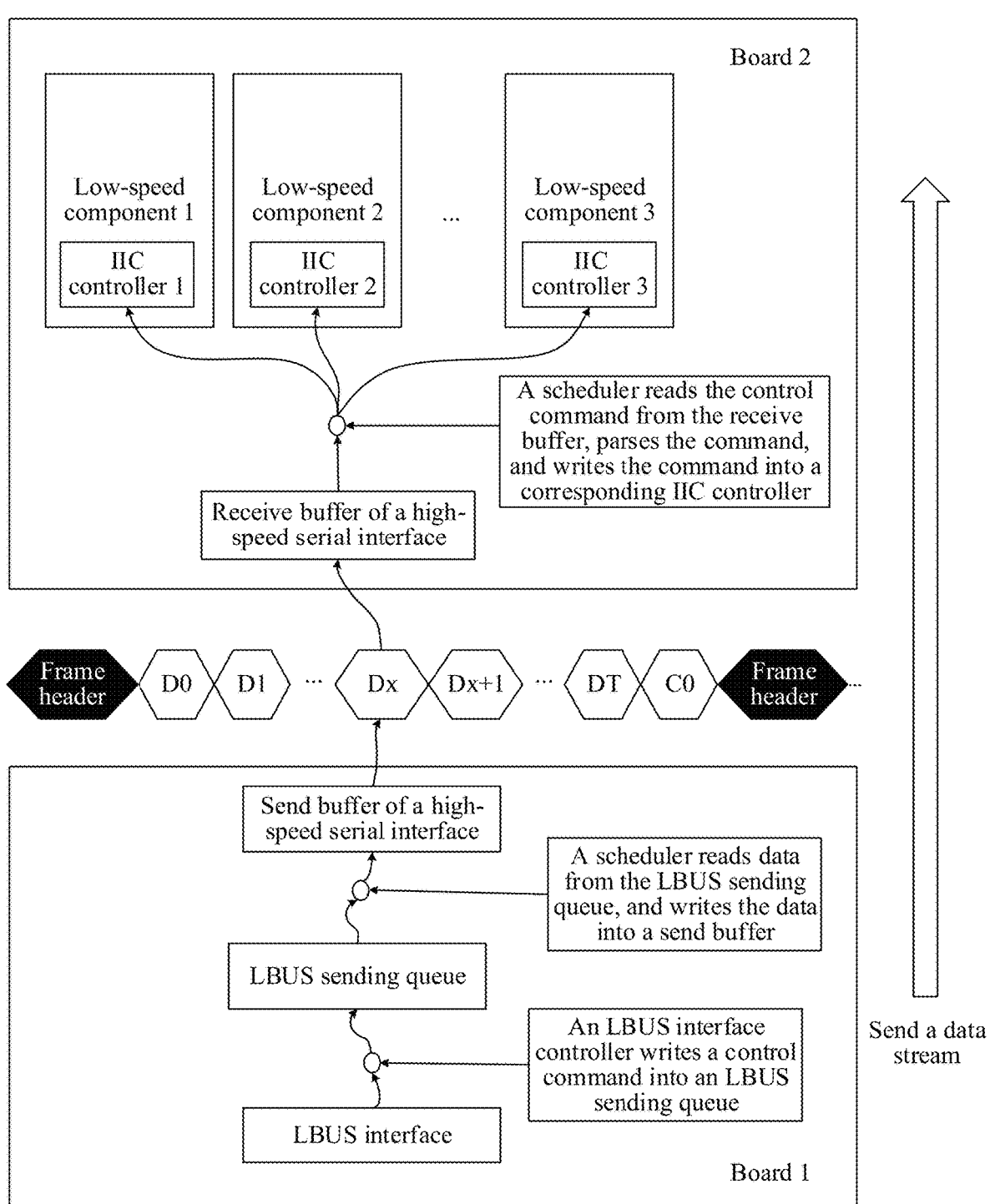
FIG. 12 is a schematic diagram in which a main control component sends a control command to a low-speed component via a data transmission chip according to an embodiment of this application.

As shown in FIG. 12, a data transmission chip 01*a* on a board 1 further includes an LBUS interface controller, and the LBUS interface controller can write, into an LBUS sending queue, a control command sent by a main control component to an LBUS interface. The LBUS sending queue may be a first in first out (FIFO) queue. For example, a width of the sending queue may be 64 bits, and a depth of the sending queue may be 512. Then, a high-speed serial interface scheduler in the data transmission chip 01*a* may read data from the LBUS sending queue, and write the read data (that is, the control command) into a send buffer of a high-speed serial interface 011*a*. A width of the send buffer may be equal to a length of each data field of a data frame, for example, may be 8 bits. A depth of the send buffer may be equal to a quantity of data fields included in the data frame, for example, may be 20.

The high-speed serial interface 011*a* may generate the data frame based on data stored in the send buffer of the high-speed serial interface 011*a*, and serially send the data frame to a data transmission chip 01*b* on a board 2. Refer to FIG. 12. The data frame may include T data fields in total from DO to DT, and a check field C0 located behind the T data fields. Assuming that a length W of each data field is 8 bits, and a length M of a gap field is 1 bit, a length of a frame header of the data frame may be 11 bits, and includes 10 bits being 1 and 1 bit being 0 that are consecutive, and the frame header may be represented as FFE by using a hexadecimal number.

Still refer to FIG. 12. After receiving the data frame, a high-speed serial interface 011*b* of the data transmission chip 01*b* on the board 2 may decode the data frame, and store, in a receive buffer of the high-speed serial interface 011*b*, data (that is, control commands carried in a plurality of data fields) obtained by decoding. A high-speed serial interface scheduler in the data transmission chip 01*b* may read the control command from the receive buffer, parse the control command, and write the control command into a corresponding low-speed component through an IIC interface. An IIC controller in the low-speed component may further write the received control command into a command queue.

Figure 13:
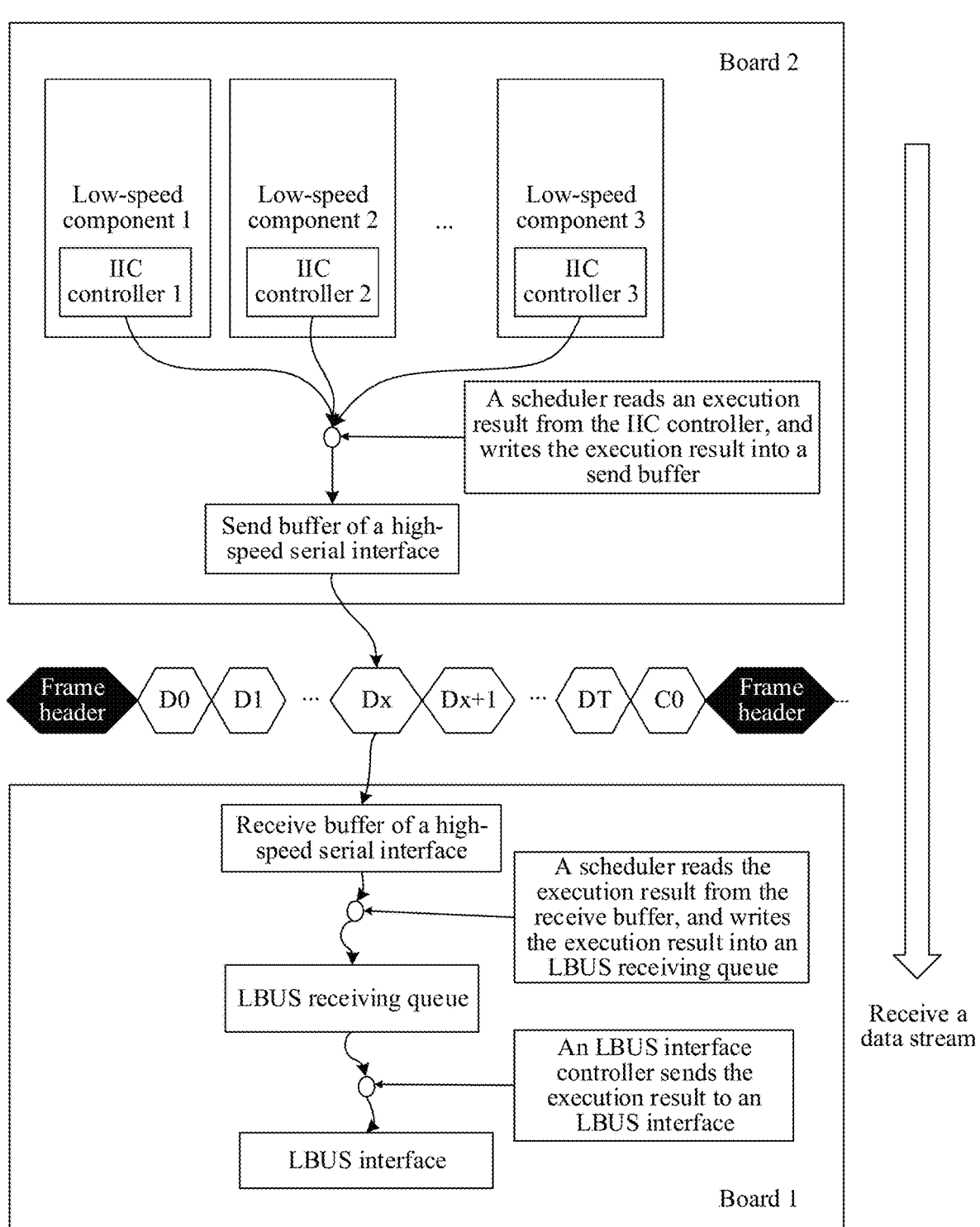
FIG. 13 is a schematic diagram in which a low-speed component sends an execution result to a main control component via a data transmission chip according to an embodiment of this application.

FIG. 13 is a flowchart of sending data by the data transmission chip 01*b* on the board 2 to the data transmission chip 01*a* on the board 1. As shown in FIG. 13, after the low-speed component on the board 2 performs an operation based on the received control command, the IIC controller may write an execution result of the operation into a result queue of the low-speed component. The high-speed serial interface scheduler in the data transmission chip 01*b* may read the execution result from the result queue of the low-speed component through the IIC interface, and write the execution result into the send buffer of the high-speed serial interface 011*b*. Then, the high-speed serial interface 011*b* may generate a data frame based on data stored in the send buffer of the high-speed serial interface 011*b*, and serially send the data frame to the data transmission chip 01*a* on the board 1.

After receiving the data frame, the high-speed serial interface 011*a* of the data transmission chip 01*a* on the board 1 may decode the data frame, and store, in the receive buffer of the high-speed serial interface 011*a*, data (that is, execution results carried in a plurality of data fields) obtained by decoding. The high-speed serial interface scheduler in the data transmission chip 01*a* may read the execution result from the receive buffer, and send the execution result to the main control component through the LBUS interface.

It may be understood that, if the high-speed serial interfaces of the data transmission chips are connected through a signal line (for example, a metallic wire or a cable), in a scenario in which the data transmission chip 01*a* sends data to the data transmission chip 01*b* unidirectionally, only one signal line may be disposed between the high-speed serial interfaces of the two data transmission chips. In a scenario in which data is bidirectionally sent between the data transmission chip 01*a* and the data transmission chip 01*b*, as shown in FIG. 1, two signal lines may be disposed between the high-speed serial interfaces of the two data transmission chips. One signal line is used by the data transmission chip 01*a* to send a data frame to the data transmission chip 01*b*, and the other signal line is used by the data transmission chip 01*b* to send a data frame to the data transmission chip 01*a*. Optionally, the signal line between the high-speed serial interfaces may also be referred to as a high-speed serial bus or a Hisport bus.

Figure 14:
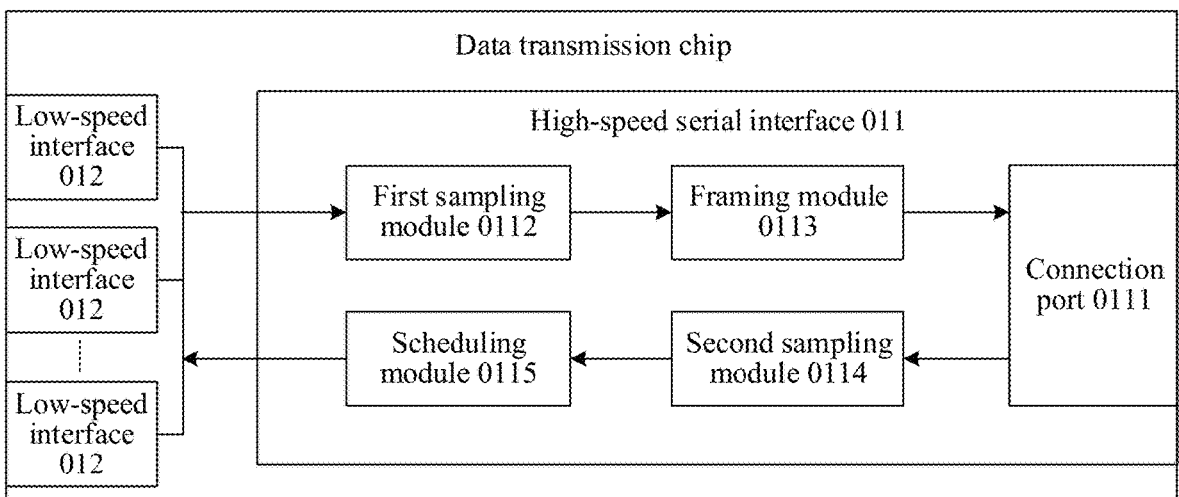
FIG. 14 is a schematic diagram of a structure of a data transmission chip according to an embodiment of this application.

FIG. 14 is a schematic diagram of a structure of a data transmission chip according to an embodiment of this application. As shown in FIG. 14, the data transmission chip includes at least one high-speed serial interface 011 and at least one low-speed interface 012. For example, FIG. 14 shows one high-speed serial interface 011 and a plurality of low-speed interfaces 012.

The high-speed serial interface 011 may include a connection port 0111, and the connection port 0111 is configured to connect to an electrical signal transmission medium 03. For example, if the electrical signal transmission medium 03 is a metallic wire, the connection port 0111 may be a pin. Alternatively, if the electrical signal transmission medium 03 is a cable, the connection port 0111 may be a cable interface.

Still refer to FIG. 14. The high-speed serial interface 011 may further include:

a first sampling module 0112, configured to sample a plurality of channels of first signals; and a framing module 0113, configured to generate a data frame based on data obtained by sampling.

The first sampling module 0112 may sample the plurality of channels of first signals in parallel based on a frequency of a clock signal of a data transmission chip 01*a*.

Optionally, data obtained by the first sampling module 0112 by sampling may include a plurality of first sampling sequences sequentially arranged based on a sampling time order, and each first sampling sequence includes a multi-bit sampling value obtained by sampling the plurality of channels of first signals in parallel for one time.

Optionally, the connection port 0111 is further used to receive a data frame serially sent by a data transmission chip 01*b*. As shown in FIG. 14, the high-speed serial interface 011 may further include:

a second sampling module 0114, configured to sample the data frame received through the connection port 0111, to obtain a plurality of channels of second signals; and a scheduling module 0115, configured to transmit the plurality of channels of second signals to the low-speed interface 012. The scheduling module 0115 may be the high-speed serial interface scheduler in the foregoing embodiments.

Optionally, the second sampling module 0114 is configured to: sample the data frame based on the frequency of the clock signal of the data transmission chip 01*a*, and restore the plurality of channels of second signals based on data obtained by sampling.

Optionally, the data obtained by the second sampling module 0114 by sampling may include a plurality of second sampling sequences sequentially arranged based on a sampling time order, and each second sampling sequence includes a multi-bit sampling value. The second sampling module 0114 may be configured to:

sequentially obtain a one-bit sampling value from each second sampling sequence, and restore one channel of second signals based on the sequentially obtained multi-bit sampling value.

It may be understood that each module in the data transmission chip described above may be a circuit module, for example, may be implemented by a programmable logic circuit.

In conclusion, embodiments of this application provide a data transmission chip. A low-speed interface of the data transmission chip is configured to receive a plurality of channels of first signals, and a high-speed serial interface of the data transmission chip is configured to serially transmit the plurality of channels of first signals to another data transmission chip in a form of a data frame. Because a plurality of channels of signals can be serially transmitted between the data transmission chips in a form of a data frame, a quantity of signal lines that need to be disposed between the data transmission chips can be effectively reduced, to further simplify a structure of an electronic device. In addition, because a data transmission rate of the high-speed serial interface is high, transmission efficiency of the plurality of channels of first signals can be effectively ensured.

An embodiment of this application further provides a data transmission chip. The data transmission chip includes a programmable logic circuit, and the data transmission chip is configured to implement a function of the data transmission chip in the foregoing embodiments.

All or some of the foregoing embodiments may be implemented by using software, hardware, firmware, or any combination thereof. When the software is used to implement embodiments, all or some of the foregoing embodiments may be implemented in a form of a computer program product. The computer program product includes one or more computer instructions. When the computer program instructions are loaded or executed on a computer, all or some of the procedures or functions according to embodiments of this application of the present invention are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, including one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

In this application, the term "at least one" means one or more. In this application, the term "a plurality of" means two or more. For example, a plurality of data fields mean two or more data fields.

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission chip, wherein the data transmission chip comprises a high-speed serial interface and a low-speed interface;

the low-speed interface is configured to receive a plurality of channels of first signals; and the high-speed serial interface is configured to serially transmit the plurality of channels of first signals to another data transmission chip in a form of a data frame, wherein the data frame comprises a frame header, a plurality of data fields, and a gap field located behind each data field, and the plurality of data fields are used to carry data obtained by sampling the plurality of channels of first signals; and wherein a data transmission rate of the high-speed serial interface is higher than a data transmission rate of the low-speed interface.

2. The data transmission chip according to claim 1, wherein the high-speed serial interface is configured to generate the data frame based on data obtained by sampling the plurality of channels of first signals.

3. The data transmission chip according to claim 2, wherein the high-speed serial interface is configured to sample the plurality of channels of first signals in parallel based on a frequency of a clock signal of the data transmission chip.

4. The data transmission chip according to claim 3, wherein the data obtained by sampling comprises a plurality of first sampling sequences sequentially arranged based on a sampling time order, and each first sampling sequence comprises a multi-bit sampling value obtained by sampling the plurality of channels of first signals in parallel for one time.

5. The data transmission chip according to claim 1, wherein the high-speed serial interface is further configured to:

receive a plurality of channels of second signals that are serially sent by the another data transmission chip in a form of a data frame, and transmit the plurality of channels of second signals to the low-speed interface.

6. The data transmission chip according to claim 5, wherein the high-speed serial interface is further configured to: sample, based on a frequency of a clock signal of the data transmission chip, the data frame sent by the another data transmission chip, and restore the plurality of channels of second signals based on data obtained by sampling.

7. The data transmission chip according to claim 6, wherein the data obtained by sampling the data frame sent by the another data transmission chip comprises a plurality of second sampling sequences sequentially arranged based on a sampling time order, and each second sampling sequence comprises a multi-bit sampling value; and the high-speed serial interface is further configured to: sequentially obtain a one-bit sampling value from each second sampling sequence, and restore one channel of second signals based on the sequentially obtained multi-bit sampling value.

8. The data transmission chip according to claim 1, wherein the data transmission chip and the another data transmission chip are located on a same printed circuit board (PCB); or the data transmission chip and the another data transmission chip are located on different printed circuit boards.

9. The data transmission chip according to claim 1, wherein the frame header comprises an N-bit first value and an M-bit second value that are consecutive, a length of each data field is W bits, the gap field comprises the M-bit second value, N is a positive integer greater than W, and M is a positive integer less than W.

10. The data transmission chip according to claim 9, wherein a difference between N and W is greater than or equal to 2, and M is 1.

11. The data transmission chip according to claim 9, wherein the first value is 1, and the second value is 0.

12. The data transmission chip according to claim 9, wherein the data frame further comprises a check field located behind the plurality of data fields, and a gap field located behind the check field; and the check field is used to carry a check bit, and a length of the check field is equal to the length of the data field.

13. An electronic device, wherein the electronic device comprises a data transmission chip, and wherein the data transmission chip comprises a high-speed serial interface and a low-speed interface;

the low-speed interface is configured to receive a plurality of channels of first signals; and the high-speed serial interface is configured to serially transmit the plurality of channels of first signals to another data transmission chip in a form of a data frame, wherein the data frame comprises a frame header, a plurality of data fields, and a gap field located behind each data field, and the plurality of data fields are used to carry data obtained by sampling the plurality of channels of first signals; and wherein a data transmission rate of the high-speed serial interface is higher than a data transmission rate of the low-speed interface.

14. The electronic device according to claim 13, wherein the high-speed serial interface is configured to generate the data frame based on data obtained by sampling the plurality of channels of first signals.

15. The electronic device according to claim 14, wherein the high-speed serial interface is configured to sample the plurality of channels of first signals in parallel based on a frequency of a clock signal of the data transmission chip.

16. The electronic device according to claim 15, wherein the data obtained by sampling comprises a plurality of first sampling sequences sequentially arranged based on a sampling time order, and each first sampling sequence comprises a multi-bit sampling value obtained by sampling the plurality of channels of first signals in parallel for one time.

17. The electronic device according to claim 13, wherein the high-speed serial interface is further configured to: receive a plurality of channels of second signals that are serially sent by the another data transmission chip in a form of a data frame, and transmit the plurality of channels of second signals to the low-speed interface.

18. The electronic device according to claim 17, wherein the high-speed serial interface is further configured to: sample, based on a frequency of a clock signal of the data transmission chip, the data frame sent by the another data transmission chip, and restore the plurality of channels of second signals based on data obtained by sampling.

19. The electronic device according to claim 18, wherein the data obtained by sampling the data frame sent by the another data transmission chip comprises a plurality of second sampling sequences sequentially arranged based on a sampling time order, and each second sampling sequence comprises a multi-bit sampling value; and the high-speed serial interface is further configured to: sequentially obtain a one-bit sampling value from each second sampling sequence, and restore one channel of second signals based on the sequentially obtained multi-bit sampling value.

20. A method, comprising:

receiving, by using a low-speed interface of a first data transmission chip, a plurality of channels of first signals; and serially transmitting, by using a high-speed serial interface of the first data transmission chip, the plurality of channels of first signals to a second data transmission chip in a form of a data frame, wherein the data frame comprises a frame header, a plurality of data fields, and a gap field located behind each data field, and the plurality of data fields are used to carry data obtained by sampling the plurality of channels of first signals, and wherein a data transmission rate of the high-speed serial interface is higher than a data transmission rate of the low-speed interface.

*     *     *     *     *